United States Patent
Maitrejean

(10) Patent No.: US 12,442,939 B2
(45) Date of Patent: Oct. 14, 2025

(54) SELF-ALIGNING ARRAY OF DETECTOR CELLS

(71) Applicant: SMITHS DETECTION FRANCE S.A.S., Vitry sur Seine (FR)

(72) Inventor: Serge Maitrejean, Vitry-sur-seine (FR)

(73) Assignee: SMITHS DETECTION FRANCE S.A.S., Vitry-sur-Seine (FR)

( * ) Notice: Subject to any disclaimer, the term of this patent is extended or adjusted under 35 U.S.C. 154(b) by 407 days.

(21) Appl. No.: 18/042,106

(22) PCT Filed: Aug. 13, 2021

(86) PCT No.: PCT/GB2021/052108
§ 371 (c)(1),
(2) Date: Feb. 17, 2023

(87) PCT Pub. No.: WO2022/038339
PCT Pub. Date: Feb. 24, 2022

(65) Prior Publication Data
US 2023/0324568 A1   Oct. 12, 2023

(30) Foreign Application Priority Data

Aug. 20, 2020 (GB) ..................... 2013016

(51) Int. Cl.
*G01T 1/164* (2006.01)
*G01T 1/29* (2006.01)
*G01V 5/22* (2024.01)

(52) U.S. Cl.
CPC .......... *G01T 1/1644* (2013.01); *G01T 1/2985* (2013.01); *G01V 5/22* (2024.01); *G06T 2207/10081* (2013.01)

(58) Field of Classification Search
USPC ...................................................... 382/154
See application file for complete search history.

(56) References Cited

U.S. PATENT DOCUMENTS

| | | | |
|---|---|---|---|
| 7,570,736 | B2 | 8/2009 | Hoffman et al. |
| 10,310,099 | B2 | 6/2019 | Scoullar et al. |
| 2012/0076257 | A1 | 3/2012 | Star-Lack et al. |

FOREIGN PATENT DOCUMENTS

| | | | |
|---|---|---|---|
| EP | 1005832 A2 | | 6/2000 |
| WO | 2005111590 A2 | | 11/2005 |

(Continued)

OTHER PUBLICATIONS

PCT International Search Report and Written Opinion, Application No. PCT/GB2021/052108, dated Nov. 24, 2021, 10 pages.

(Continued)

*Primary Examiner* — Jacky X Zheng
(74) *Attorney, Agent, or Firm* — Armstrong Teasdale LLP

(57) ABSTRACT

A method for determining a flux of inspection radiation is provided, wherein the inspection radiation is emitted by a radiation source and transmitted through cargo, and wherein the flux of inspection radiation is incident on at least one array of detector cells. The detector cells are configured in a first plurality L forming rows of the array, each row of detector cells extending along a direction parallel to a depth direction of the array, the detector cells being further configured in a second plurality λ forming columns of the array, each column of detector cells extending along a direction parallel to a longitudinal direction of the array. The method includes obtaining signal data associated with each detector cell of the array, and determining the flux of the inspection radiation incident on row i, for each row i such as $1 \leq i \leq L$, based on the signal data for each detector cell.

20 Claims, 11 Drawing Sheets

(56) References Cited

FOREIGN PATENT DOCUMENTS

| | | | |
|---|---|---|---|
| WO | 2007014099 | A2 | 2/2007 |
| WO | 2009106803 | A2 | 9/2009 |
| WO | 2017192597 | A1 | 11/2017 |

OTHER PUBLICATIONS

GB Search and Examination Report, Application No. 2013016.7, dated Feb. 19, 2021, 4 pps.
European Examination Report, Application No. 21765971.3, dated Jun. 4, 2025, 7 pages.

SELF-ALIGNING ARRAY OF DETECTOR CELLS

CROSS-REFERENCE TO RELATED APPLICATIONS

This patent application is a National Stage Entry of PCT/GB2021/052108 filed on Aug. 13, 2021, which claims priority to GB Application No. 2013016.7 filed on Aug. 20, 2020, the disclosures of which are hereby incorporated by reference herein in their entirety as part of the present application.

BACKGROUND

The disclosure relates, but is not limited to, a method for determining a flux of inspection radiation. The disclosure also relates to associated apparatus and an associated computer program or computer program product.

For high energy radioscopy applications (e.g. scanners for cargo inspection), the detectors (such as scintillator/photo-diodes-based detectors or semi-conductor detectors) have an important thickness (e.g. several centimetres) in the direction of propagation of the flux of inspection radiation, in order to detect a large fraction of the incident flux and provide reliable imaging data for which the quantum Poisson noise is as low as possible.

Inspection systems usually include an array of a plurality of detectors in one or more directions perpendicular to the direction of the flux of inspection radiation, for providing spatial resolution in the one or more directions (the typical pitch of the plurality of detectors in the one or more directions is of a few millimeters).

Because of the thickness of the detectors, the detectors must be oriented towards the focal spot of emission of the flux of inspection radiation. This is because, while the resolution is preserved for the detector facing the focal spot, if the detectors are not oriented towards the focal spot the spatial resolution is affected by the parallax effect. The spatial resolution of the detectors which are not oriented towards the focal spot is degraded because the flux of inspection radiation is crossing several contiguous detectors before being absorbed. The resolution is increasingly degraded with the angle between the beams of the inspection radiation and a direction normal to the detectors' entrance face.

Therefore, the detectors of any conventional inspection system must be carefully aligned, and each detector must precisely point towards the focal spot. The alignment requirement for the detectors of the conventional inspection systems has important mechanical consequences on the mechanical design and on mechanical tolerances of the conventional inspection systems.

The required alignment is time consuming when manufacturing the inspection system or when changing critical elements in the inspection system, like the inspection radiation source or the detectors. The required alignment also makes it impossible to have a single line of detection for multi-view systems, and a conventional dual-view inspection system must have a dual-line of detection.

BRIEF DESCRIPTION

Aspects and embodiments of the disclosure are set out in the appended claims. These and other aspects and embodiments of the disclosure are also described herein.

DETAILED DESCRIPTION

Overview

The disclosure describes several embodiments. In embodiments of the disclosure, detector cells of at least one array are arranged in a first plurality of detector cells (e.g. arranging the detector cells in rows in a longitudinal direction of the array) and in a second plurality of detector cells (e.g. arranging the detector cells in columns in a depth direction perpendicular to the longitudinal direction). A described method for determining a flux of inspection radiation includes obtaining signal data associated with each detector cell of the array and determining the flux of the inspection radiation incident on each row of the array, based on the obtained signal data.

The determined flux enables generating an inspection image, without the need for the detectors to be aligned towards the focal spot of the inspection radiation source. The detector cells may thus be referred to as self-aligning in the present disclosure. Reciprocally, it should be understood that the position of the inspection radiation source with respect to the array of detector cells is not critical for generating the inspection image. Therefore, the inspection radiation source may be moved with respect to the array of detector cells (e.g. for applications such as computed tomography for inspection of cargo) and/or the inspection radiation system may include several inspection radiation sources for one array of detector cells.

Inspection systems implementing the disclosure are easier and cheaper to manufacture compared to equivalent conventional inspection systems.

The disclosure may be applied to single view or multi-view systems (with several inspection radiation sources and/or several arrays of detector cells).

DETAILED DESCRIPTION OF EXAMPLE EMBODIMENTS

Figure 1:
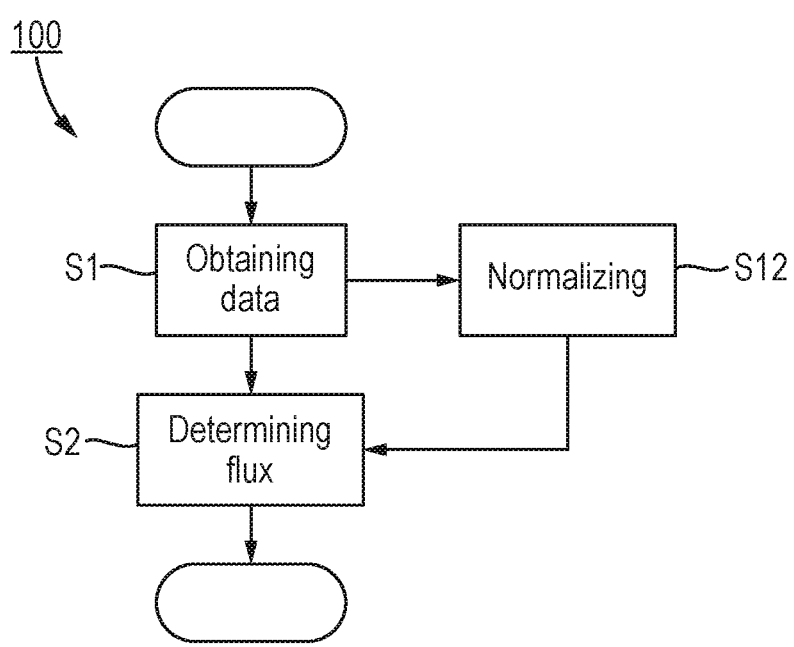
FIG. 1 schematically illustrates a first example method according to the disclosure.

FIG. 1 schematically illustrates a first example method 100 for determining a flux of inspection radiation, according to the disclosure.

In the method 100 of FIG. 1, the method 100 includes obtaining at 51 signal data, and determining, at S2, the flux of the inspection radiation.

Figure 2:
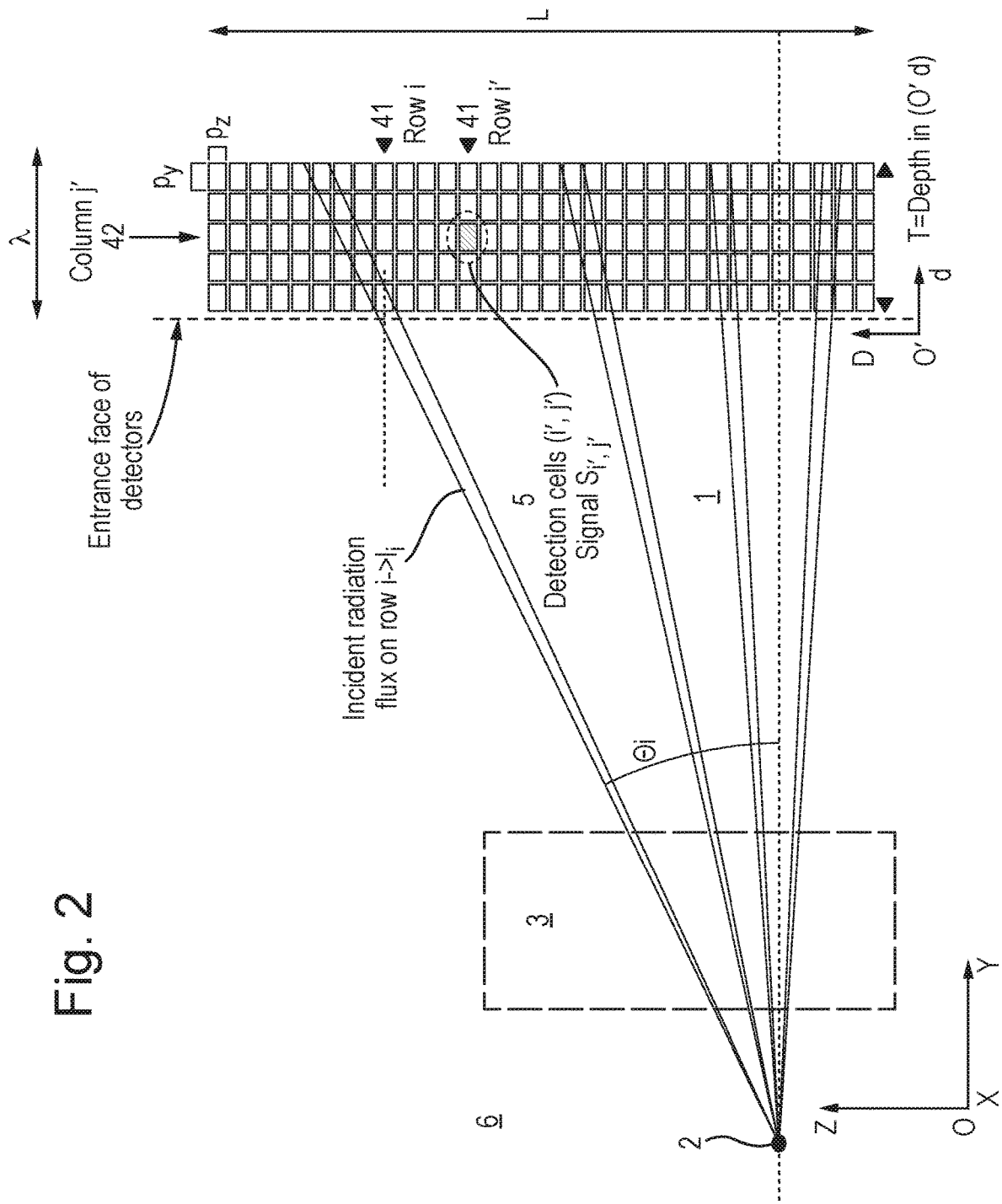
FIG. 2 schematically illustrates an example system including an example array according to the disclosure.

FIG. 2 schematically illustrates inspection radiation 1 emitted by a radiation source 2 and transmitted through cargo 3 to inspect substantially in a transmission plane (YOZ). The flux of inspection radiation 1 is incident, after transmission through the cargo 3, on at least one array 4 of detector cells 5 extending in a plane (e.g. plane of FIG. 2) substantially parallel to the transmission plane (YOZ).

In FIG. 2, the array 4 has a depth direction (O'd), and a longitudinal direction (O'D) substantially perpendicular to the depth direction (O'd).

The detector cells 5 are configured in a first plurality L forming substantially rows 41 of the array 4. In FIG. 2, each row 41 of detector cells 5 extends substantially along a direction parallel to the depth direction (O'd) of the array 4.

The detector cells 5 are further configured in a second plurality λ forming substantially at least two columns 42 of the array 4. In FIG. 2, each column 42 of detector cells 5 extends substantially along a direction parallel to the longitudinal direction (O'D) of the array 4.

In FIG. 2, direction (OX) (which is perpendicular to the plane (YOZ)) is the direction of scanning of the cargo 3, i.e. the direction of mutual displacement of the cargo 3 with respect to an inspection system 6 including the source 1 and the array 4.

As it will be apparent in the disclosure, the depth direction (O'd) of the array 4 may not be strictly perpendicular to the longitudinal direction (O'D).

In FIG. 2, a distance $p_y$ between the columns 42 of the array 4 is a constant. As it will be apparent in the disclosure, the distance $p_y$ may not be a constant. In FIG. 2, T is the total thickness of the array 4 in the depth direction (O'd). $\theta_i$ is the incident angle of the inspection radiation 1 on row i of the array 4.

In FIG. 2, a pitch $p_z$ between the rows 41 of the array 4 is a constant. The constant pitch $p_z$ allows a homogeneous resolution in the direction (O'D).

Figure 3:
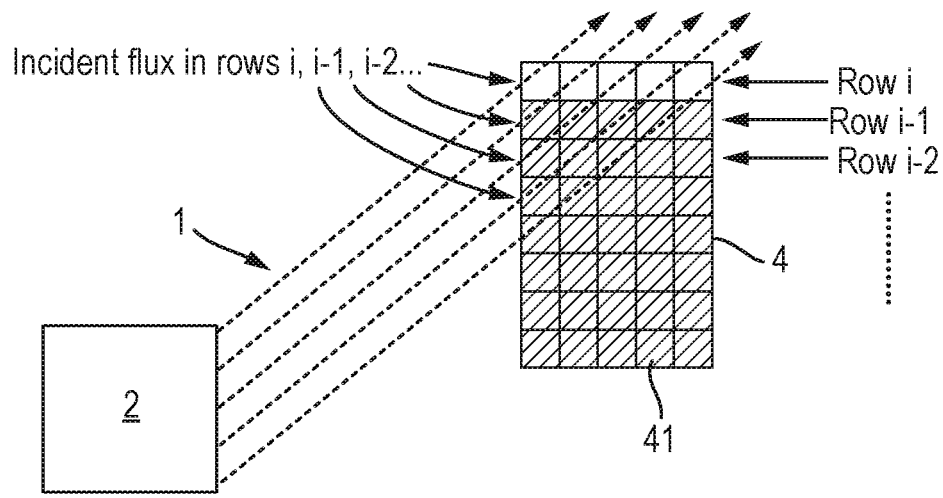
FIG. 3 schematically illustrates a detail of rows of an array according to the disclosure.

An inspection image of the cargo 3 may be generated using the flux of inspection radiation 1 incident on rows 41 of the array 4 (and the method may include generating the inspection image of the cargo, based on the determined flux $I_i$ of the inspection radiation incident on row i, for each row i such as 1≤i≤L). As illustrated in FIGS. 2 and 3, when the rows 41 of the array 4 are not aligned with the source 2, the total signal of a given row 41 depends on the incident flux on several rows in the neighbourhood of the given row 41.

In order to take into account the incident flux on the several rows in the neighbourhood of any given row, in FIG. 1, obtaining at 51 the signal data includes obtaining the signal data $S_{i'j'}$ associated with each detector cell 5 of the array 4.

As illustrated in FIG. 2, each detector cell 5 is located in (i',j') at an intersection of a column j' (numerical reference 42) and a row i' (numerical reference 41) of the array 4.

The obtained signal data S for the array 4 of detector cells 5 is such that:

$$S=F(I,R) \quad \text{(Eq. 1)}$$

with I being a flux assembly corresponding to the flux of the inspection radiation incident on the rows of the array, R being a contribution arrangement of coefficients $R_{i'j'}^i$ for the array of detector cells, representing a contribution of a beam of the inspection radiation, incident on row i such that 1≤i≤L, to the signal data $S_{i'j'}$ of the detector cell located in (i',j') incident on the rows i of the array, and F being a known function of I and R.

The equation (Eq. 1) above enables to determine at S2 the flux $I_i$ of the inspection radiation incident on row i, for each row i such that 1≤i≤L, based on the obtained signal data $S_{i'j'}$ and the coefficient $R_{i'j'}^i$ for each detector cell located in (i',j') at the intersection of the column j' and the row i' of the array.

The incident flux on the rows 41 enable to generate an inspection image with optimal resolution in the longitudinal direction (O'D), regardless of the position and the angle of incidence of the flux of the inspection radiation 1 on the array 4.

In order to take into account the different behaviors of the detector cells 5 under irradiation, the signal may be normalized with respect to a value one or to any arbitrary number which may represent the full scale inspection radiation obtained when no object is placed in the irradiation radiation.

The method 100 may thus include the optional step S12 including normalizing the obtained signal data S, such that:

$$S_{i'j'}^N = \frac{S_{i'j'}}{S_{i'j'}^0}$$

with $S_{i'j'}^0$ being a signal obtained when no object is placed in the S° 1, irradiation radiation.

Alternatively or additionally, the optional step S12 may include normalizing the contribution arrangement R, such that:

$$C_{i'j'}^i = \frac{R_{i'j'}^i}{\sum_{k=1}^{L} R_{i'j'}^k}$$

At the end of S12, the obtained signal may be such that:

$$S^N = F^N(I,C)$$

with $F^N$ a known function of I and C.

In examples where the detector cells 5 do have a linear response as a function of the flux input, the known function F may be a linear function such that:

$$S_{i'j'} = \sum_{i=1}^{L} R_{i'j'}^{i} I_i$$

with $I_i$ the flux of the inspection radiation incident on row i, and $R_{i'j'}^{i}$ representing a contribution of a beam of the inspection radiation, incident on row i, to the signal data $S_{i'j'}$ of the detector cell located in (i',j').

In cases where it is desired that the signal data and the contribution arrangement are normalized, normalizing at S12 the obtained signal data $S_{i'j'}^{N}$ for each detector cell being located in (i',j') may be such that:

$$S_{i'j'}^{N} = \frac{S_{i'j'}}{S_{i'j'}^{0}} = \frac{S_{i'j'}}{\sum_{k=1}^{L} R_{i'j'}^{k} I_{k}^{0}} = \frac{\sum_{i=1}^{L} R_{i'j'}^{i} I_i}{\sum_{k=1}^{L} R_{i'j'}^{k} I_{k}^{0}} = \sum_i \left( \frac{R_{i'j'}^{i} I_i}{\sum_{k=1}^{L} R_{i'j'}^{k}} \right) = \sum_i C_{i'j'}^{i} I_i \quad \text{(Eq. 2)}$$

with $S_{i'j'}^{N} \in [0,1]$, with $S_{i'j'}^{0} = \sum_{i=1}^{L} R_{i'j'}^{i} I_{i}^{0}$ with $I_{i}^{0}$ being the flux of full-scale inspection radiation obtained when no object is placed in the irradiation radiation, incident on row i, with $I_{i}^{0}$ being chosen equal to 1 for each row i such that $1 \le i \le L$, which implies the $I_i$ to have values in [0,1], with each coefficient $C_{i'j'}^{i}$ being such that $$C_{i'j'}^{i} = \frac{R_{i'j'}^{i}}{\sum_{k}^{L} R_{i'j'}^{k}},$$

and with $\sum_i C_{i'j'}^{i} = 1$.

Eq. 2 may be solved, because Eq. 2 is overdetermined: the number of unknowns is the fluxes I in the rows, while the number of data acquired is the total number of obtained signal S for the detector cells, which is larger than the number of unknowns.

In cases where the signal data and the contribution arrangement are indeed normalized, determining at S2 the flux $I_i$ of the inspection radiation incident on row i, for each row i such as $1 \le i \le L$, is based on the normalized uniform signal data $S_{i'j'}^{N}$ and the coefficient $C_{i'j'}^{i}$ for each detector cell located in (i',j') at the intersection of the column j' and the row i' of the array.

In some cases, determining at S2 the flux $I_i$ of the inspection radiation incident on row i, for each row i such that $1 \le i \le L$, may include using a least squares regression to find a set of fluxes $I_i$ which minimizes a criterion $L_s$, such that:

$$L_s = \sum_{i',j'} (S_{i'j'}^{N} - \sum_i C_{i'j'}^{i} I_i)^2.$$

In such cases, the set of fluxes $I_i$ which minimizes the criterion $L_s$ is determined using a gradient minimalization technique.

Alternatively or additionally, the set of fluxes $I_i$ which minimizes the criterion $L_s$ may be determined by determining a solution of a matrix equation $M_{ki}$ such that:

$$\forall k, \sum_{i',j'} C_{i'j'}^{k} S_{i'j'}^{N} = \sum_i \left( \underbrace{\sum_{i',j'} C_{i'j'}^{k} \cdot C_{i'j'}^{i}}_{M_{ki}} \right) \cdot I_i \quad \text{(Eq. 3)}$$

Figure 4:
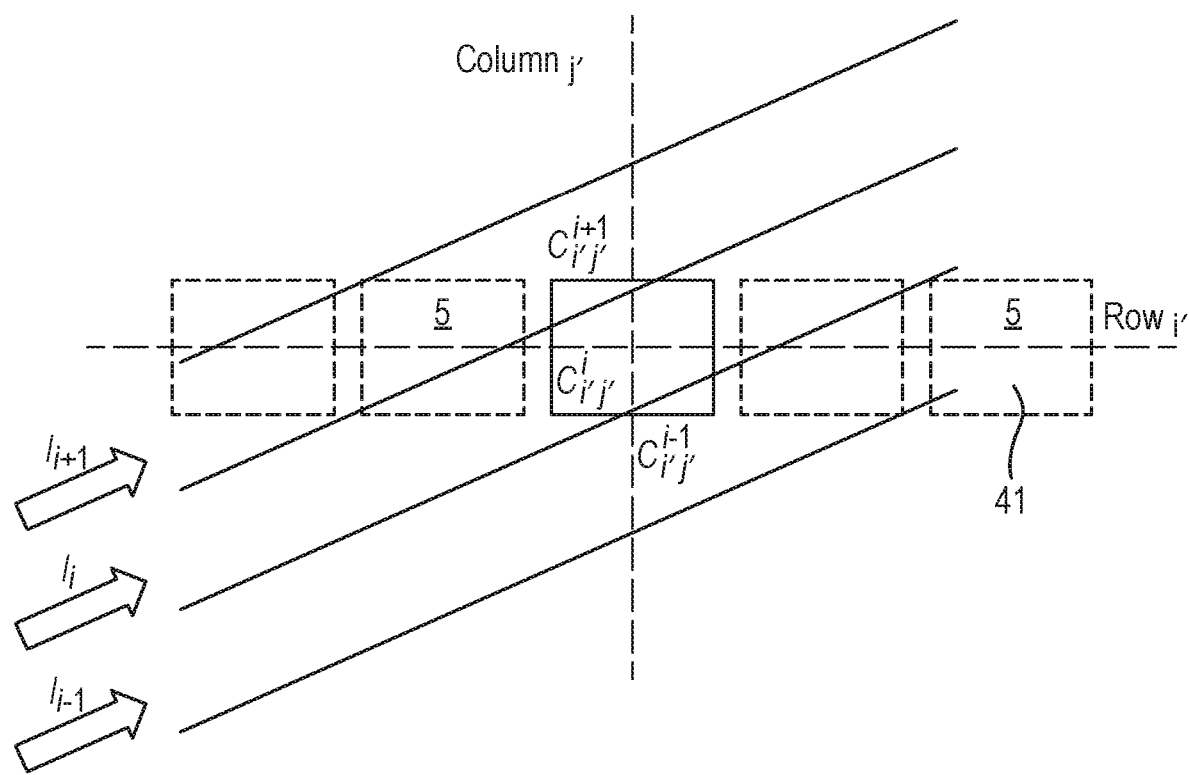
FIG. 4 schematically illustrates a graphical representation of the coefficient C for a detector cell in (i',j') intercepting the beams incident on three contiguous rows (i−1, i and i+1)

FIG. 4 schematically illustrates a graphical representation of the coefficient C for a detector cell 5 in (i',j') intercepting the beams incident on three contiguous rows 41 (i−1, i and i+1). The coefficient is the proportion of the signal in (i',j') coming from the inspection radiation 1 incident on row i.

Figure 5:
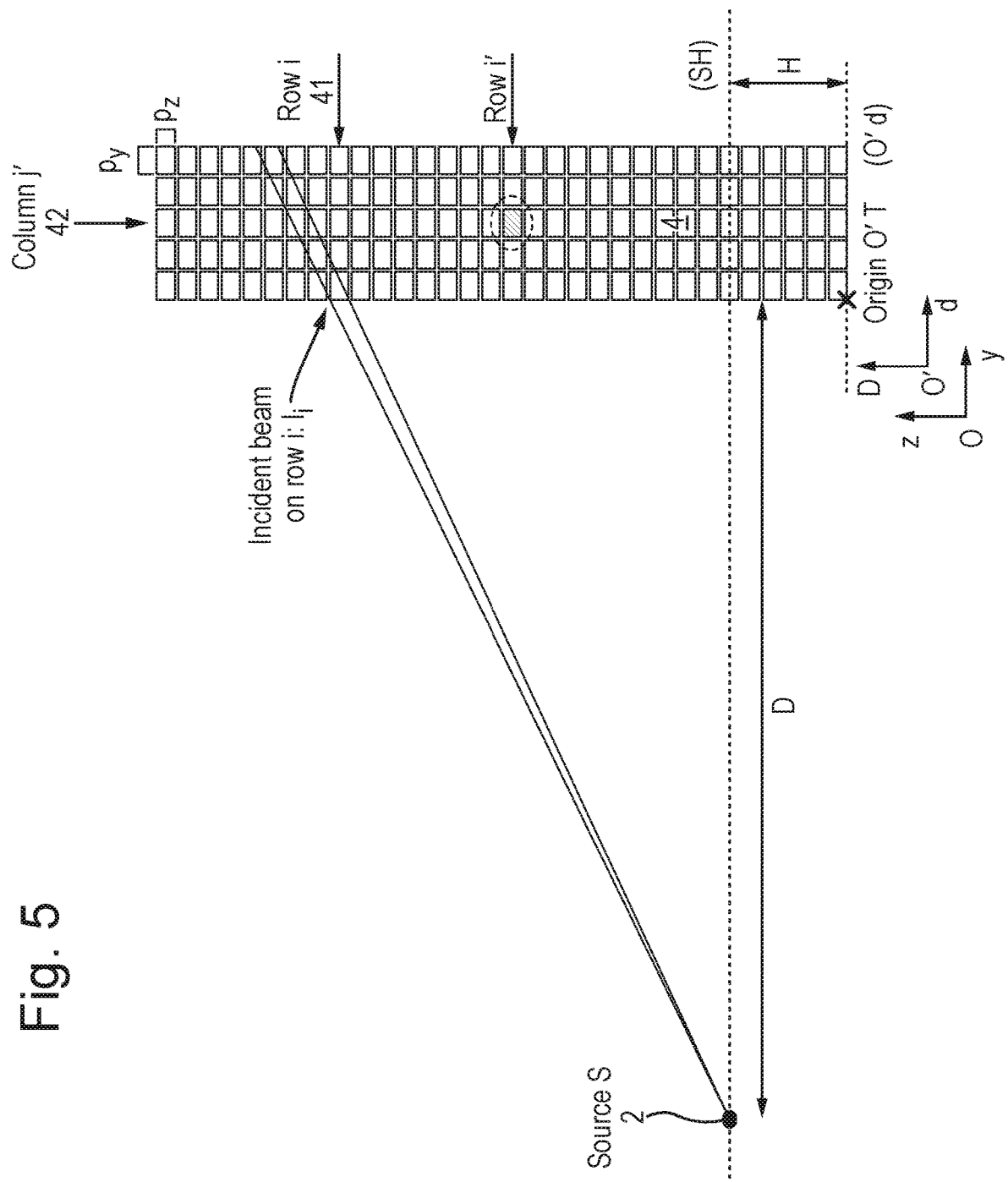
FIG. 5 schematically illustrates the dependence of each coefficient $C_{i'j'}{}^{i}$ on some parameters of the inspection system.

As illustrated in FIG. 5, each coefficient $C_{i'j'}^{i}$ depends on at least one of:
- a distance D, between the radiation source 2 and the array 4 of detectors cells 5; and/or
- a height H of the source 2 associated with a distance between a first line (e.g. (O'd)) parallel to a lower part of the array 4 and a second line (e.g. SH) parallel to the first line (e.g. (O'd)) and passing through the radiation source 2; and/or
- a pitch $p_z$ of the array 4 along a direction parallel to the longitudinal direction (O'D), and a distance $p_y$ between the columns 42 of the array 4 along a direction parallel to the depth direction (O'd) of the cells 5.

Therefore, in cases where the location of the source 2 is modified or in cases where there are several sources 2, it is sufficient to modify the set of coefficients $C_{i'j'}^{i}$ to be able to generate a new inspection image, without the need of changing the position or the location of the detector cells with respect to the source(s).

It should thus be understood that modifying the set of coefficients $C_{i'j'}^{i}$ and determining at S2 the flux $I_i$ of the inspection radiation is producing the same result than re-orienting the detector cells towards the new location of the source or the new source. The array of detector cells may be referred to as self-aligning towards the source(s) in the present disclosure.

In theory, for each pair (H,D) illustrated in FIG. 5, a three-dimension arrangement $C_{i'j'}^{i}$ could be calculated. However, this may be time-consuming if the calculations are made on the fly and/or this may be disk-space consuming if the calculations are made before determining the flux. Calculating a three-dimension arrangement $C_{i'j'}^{i}$ may be envisaged for a single view inspection system with well-known locations for the source and the detectors cells, but this would be too complicated for a multi-view inspection system.

We note that, although the contributions $R_{i'j'}^{i}$ form a three-dimension arrangement, the majority of the contributions are equal to zero. This is because $|i'-i| \cdot p_z > T \cdot \tan(\theta_i)$, a beam incident in row i does not cross a detector cell 5 located at (i',j'), regardless of the value of j'. Therefore $R_{i'j'}^{i}$ is equal to zero. As illustrated in FIG. 4, the signal in a cell (i',j') comes from a very small number of incident flux $I_i$, and the three-dimensional arrangement of coefficients $C_{i'j'}^{i}$ has very few non null coefficients.

Therefore, the matrix $M_{ki}$ of (Eq. 3) has only non-null coefficients in the neighbourhood of the diagonal of the matrix, and the matrix may be inverted. This confirms that knowing the coefficients $C_{i'j'}^{i}$ enables to determine the flux $I_i$, hence enabling generation of an inspection image, based on the obtained data $S_{i'j'}^{N}$ on each detector cell 5.

Therefore, determining the solution of the matrix equation $M_{ki}$ of (Eq. 3) may include conditioning the matrix $M_{ki}$— such that the matrix $M_{ki}$ does not have significant coefficients far from the diagonal—and inverting the matrix $M_{ki}$.

Figure 6:
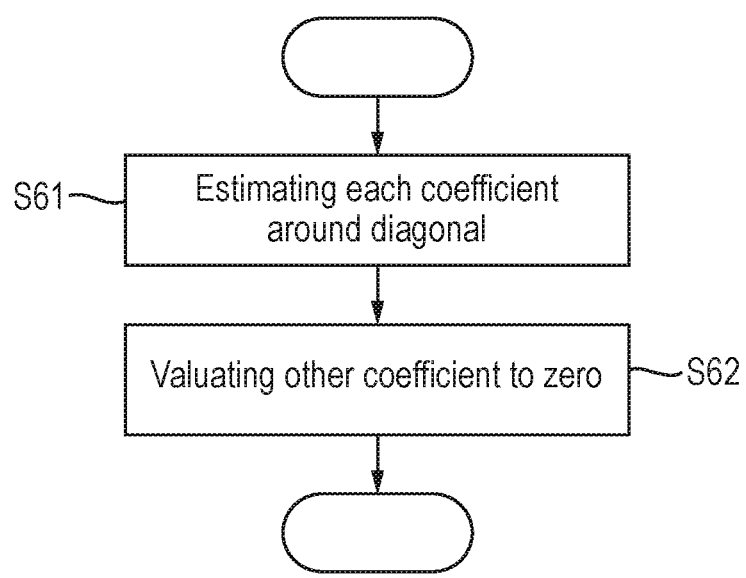
FIG. 6 schematically illustrates example steps of a method of conditioning a matrix $M_{ki}$ such that the matrix $M_{ki}$ does not have significant coefficients far from the diagonal.

In some examples, as illustrated in FIG. 6, conditioning the matrix $M_{ki}$ may include estimating at S61 each coefficient $C_{i'j'}{}^i$ which contributes to the terms of the matrix $M_{ki}$ substantially around the diagonal of the matrix $M_{ki}$ and valuating at S62 other coefficients of the matrix $M_{ki}$ to a null value.

Figure 7:
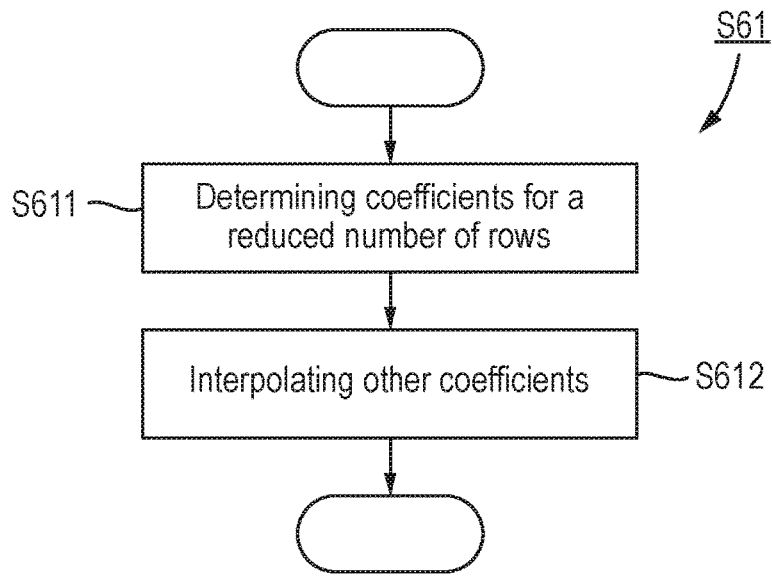
FIG. 7 schematically illustrates example steps of a method of estimating each coefficient substantially around the diagonal of the matrix $M_{ki}$.

In some examples, as illustrated in FIG. 7, estimating at S61 each coefficient City' substantially around the diagonal of the matrix $M_{ki}$ may include, for D>>$p_z$ and D>>T, and for a given pair (H,D) and a given column j':
  determining, at S611, coefficients $C_{i'j'}{}^i$ for a reduced set of rows i; and
  interpolating, at S612, other coefficients $C_{i'j'}{}^i$, based on the determined coefficients $C_{i'j'}{}^i$ for the reduced set of rows i.

Figure 8:
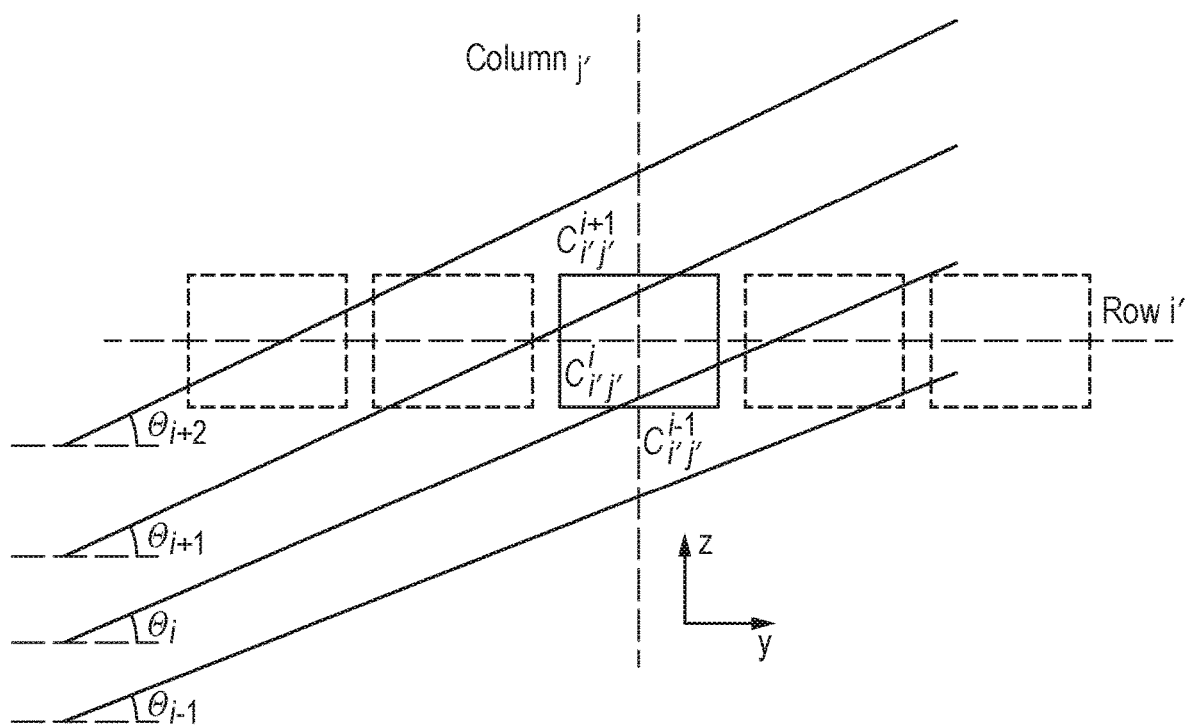
FIG. 8 schematically illustrates that determining the coefficients may be based on the parameters H, D, z, y, $p_z$, $p_y$, i, i', j' of FIG. 5 and the angles $\Theta_i$ and $\Theta_{i+1}$ which are the angle bracketing the inspection radiation incident on row i.

As illustrated in FIG. 8, determining at S611 the coefficients $C_{i'j'}{}^i$ for the reduced set of rows i may use an integral which gives a deposit energy in the geometrical area corresponding to each of the coefficients to be determined. In FIG. 8, the determining is based on the parameters H, D, z, y, $p_z$, $p_y$, j' of FIG. 5 and the angles $\Theta_i$ and $\Theta_{i+1}$ which are the angle bracketing the inspection radiation incident on row i, as well as the inspection radiation spectrum and the detector inspection radiation absorption coefficients.

In such an example, determining at S611 the coefficients $C_{i'j'}{}^i$ for the reduced set of rows i may include determining the contribution $R_{i'j'}{}^i$ such that:

$$R_{i'j'}^i = \int_{y=j' \cdot p_y}^{y=(j'+1) \cdot p_y} \int_{z=(i' \cdot p_z - H)}^{z=(i'+1) \cdot p_z - H} \int_0^{E_M} I(E, \theta) \cdot \mu_{en}(E) \cdot E \cdot \frac{e^{-\frac{\mu(E) \cdot y}{\cos(\theta)}}}{(D+y)^2} \cdot \cos(\theta) \cdot$$

$$u(\cos(\theta_i) - \cos(\theta)) \cdot u(\cos(\theta) - \cos(\theta_{i+1})) \cdot dE \cdot dz \cdot dy$$

with:
E=a variable associated with the energy of the inspection radiation,
$E_M$=a maximum of the energy of the inspection radiation,
θ=an angular incidence of the inspection radiation on the array in the transmission plane (YOZ), with an y axis being parallel to the depth direction and a z axis being parallel to the longitudinal direction, such that:

$$\tan(\theta) = \left(\frac{z-H}{D+y}\right), \cos(\theta) = \sqrt{\frac{1}{1+\left(\frac{z-H}{D+y}\right)^2}},$$

$\theta_i$=an angle of incidence of the inspection radiation on row i, such that:

$$\tan(\theta_i) = \left(\frac{i \cdot p_z - H}{D}\right),$$

I(E, θ)=spectral and angular distributions of the inspection radiation,
$\mu_{en}(E) \cdot E$=a mean deposit energy in the detector cell for a photon of energy E, and
u=a step function.

Alternatively or additionally, if it is considered that the main contribution to coefficients C comes from the geometrical part (x, y, H, D, $p_z$, $p_y$) and if $C_{i'j'}{}^i$ is interpreted as the fraction of the cells (i',j') which is crossed by beams incident on row i, determining at S611 the coefficients $C_{i'j'}{}^i$ for the reduced set of rows i may include determining the contribution $R_{i'j'}{}^i$ such that:

$$R_{i'j'}^i = \int_{y=j' \cdot p_y}^{y=(j'+1) \cdot p_y} \int_{z=(i' \cdot p_z - H)}^{z=(i'+1) \cdot p_z - H} \frac{1}{(D+y)^2} \cdot$$

$$\cos(\theta(x, y)) \cdot u(\cos(\theta_i) - \cos(\theta(x, y))) \cdot u(\cos(\theta(x, y) - \cos(\theta_{i+1}))dz \cdot dy$$

with:
θ=an angular incidence of the inspection radiation on the array in the transmission plane (YOZ), with an y axis being parallel to the depth direction and a z axis being parallel to the longitudinal direction, such that:

$$\tan(\theta) = \left(\frac{z-H}{D+y}\right), \cos(\theta) = \sqrt{\frac{1}{1+\left(\frac{z-H}{D+y}\right)^2}},$$

$\theta_i$=an angle of incidence of the inspection radiation on row i, such that:

$$\tan(\theta_i) = \left(\frac{i \cdot p_z - H}{D}\right),$$

and
an x axis being perpendicular to both the depth direction and the longitudinal direction.

Alternatively or additionally, determining at S611 the coefficients $C_{i'j'}{}^i$ for the reduced set of rows i may include using a Monte-Carlo method configured to calculate:
  angular and spectral distributions of the inspection radiation 1, and/or
  a simulation configured to estimate an energy deposit in the detector cell (i',j').

We note that an error on the coefficients C can only smooth the results of the calculations, because the coefficients are always positives. Therefore, alternatively or additionally, the coefficients can be adjusted by finding a set of coefficients which give the sharpest edges in the resulting inspection images. In such a case, determining at S611 the coefficients $C_{i'j'}{}^i$ for the reduced set of rows i may include:
  determining initial coefficients $C_{i'j'}{}^i$ and generating an image $I^c$ of the cargo, based on the determined initial coefficients $C_{i'j'}{}^i$;
  generating an image $I^a$ of the cargo, based on initial adjusted coefficients $C_{i'j'}{}^i$ corresponding to adjusted determined initial coefficients $C_{i'j'}{}^i$; and
  determining final adjusted coefficients $C_{i'j'}{}^i$ minimizing a criterion such that:

$$\sum_{images} \sum_i \left((I_i^a - I_i^c)^2 + \frac{m}{(\nabla I^a)_i^2}\right)$$

with ∇ is a gradient operator, and m a positive parameter.
In such cases, the signal data $S_{ij'}$ may be associated with cargo with sharp edges.

In some examples, interpolating, at S612, the other coefficients $C_{i'j'}{}^i$, based on the coefficients $C_{i'j'}{}^i$ determined at S611 for the reduced set of rows i, may be performed as follows.

The interpolating performed at S612 may be made much easier using several properties as described below.

The interpolating performed at S612 may use the property of the typical distances in the inspection system. The distance D between the source and the array is of several meters (typically seven to fifteen meters), while the pitch $p_z$ is of a few millimeters and the total thickness T of the array is of a few centimeters.

This property has three main consequences which can be explained below.

The first consequence is that the variation of C according the index i and i' is very slow.

Figure 9A:
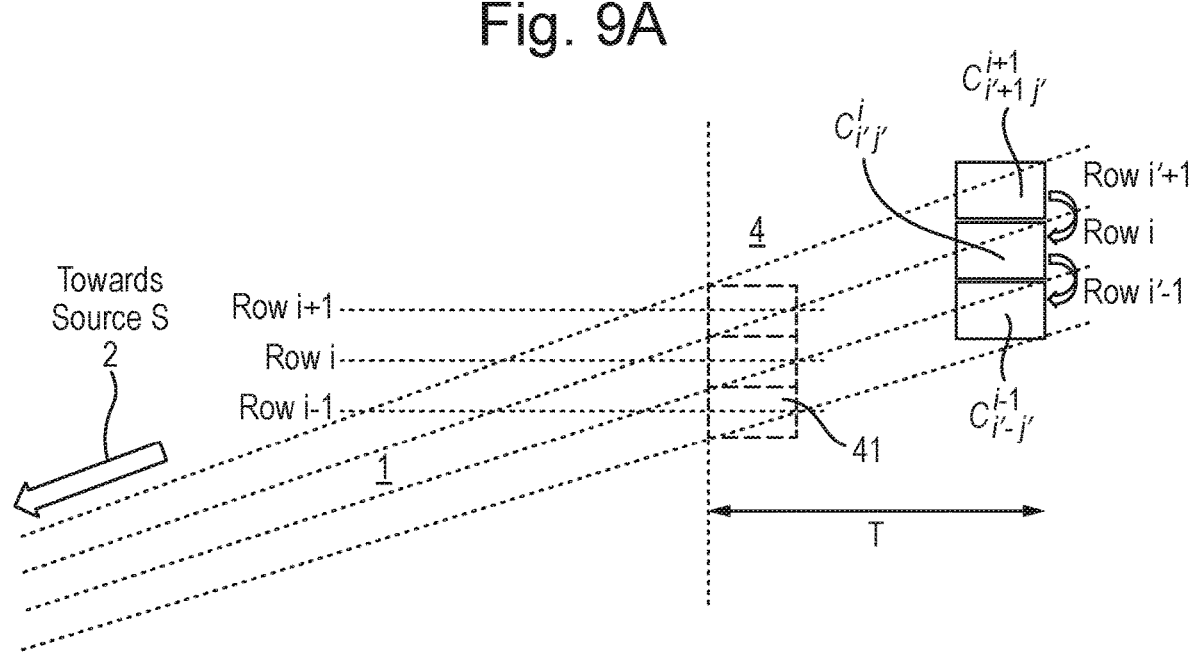
FIG. 9A schematically illustrates that the beams of inspection radiation are substantially parallel between two adjacent rows.

For given geometric parameters H and D, the value of $C_{i'j'}{}^i(H,D)$ and $C_{i'\mp 1\ j'}{}^{i\mp 1}(H,D)$ are very close to each other, because as illustrated in FIG. 9A, the beams of inspection radiation 1 are substantially parallel between two adjacent rows 41.

For a given column j' and for a given entrance row i, the indexes i' for which the C are not null is very limited (a few units at most). On the right-hand detectors cells of FIG. 9A, the number of non-null coefficients is two. This number depends slowly on i, and this number is equal to one for the row in front of the source 2.

For a given source (H and D given), the quasi-parallel nature of the beams at the level of the detector cells shows that the values of $C_{i'j'}{}^i$ and $C_{i'\mp 1\ j'}{}^{i\mp 1}$ are very close.

Therefore, in some examples the other coefficients $C_{i'j'}{}^i$ may be interpolated based on the coefficients $C_{i'j'}{}^i$ determined at S611 for the reduced set $i_p$ (p=1, 2, $P_{max}$) of rows i, such that:

$$C_{i'j'}^{i} \approx C_{i'-(i-i_p)j'}^{i_p} + \frac{\left(C_{i'-(i-i_{p+1})j'}^{i_{p+1}} - C_{i'-(i-i_p)j'}^{i_p}\right)}{(i_{p+1} - i_p)} \cdot (i - i_p)$$

with $i_p \leq i \leq i_{p+1}$, and
with p and $P_{max}$ being positive integers.

As for each (i, j') the number of non-null C is at most of a few units, the number of calculations for the given H and D is dramatically reduced, e.g. for an array of one thousand rows, the number of calculations may be reduced from one million to less than one thousand.

Figure 9B:
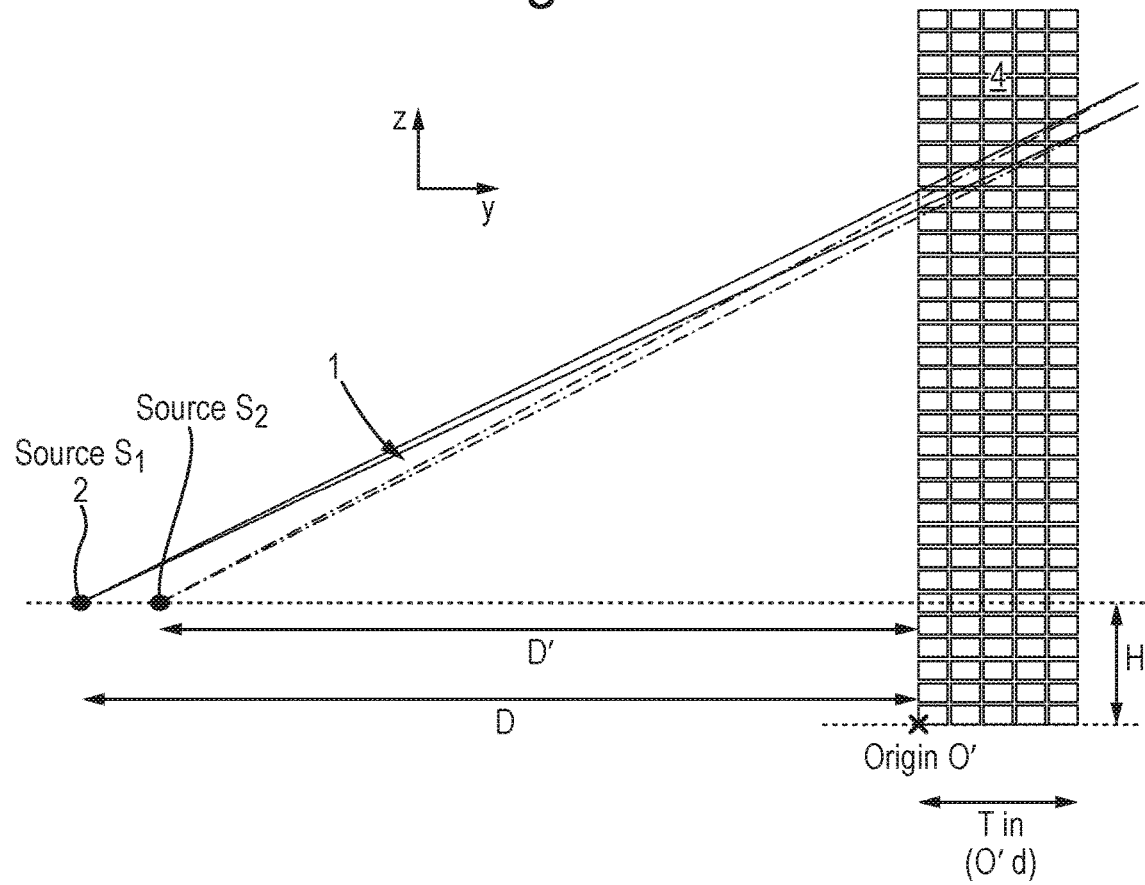
FIG. 9B schematically illustrates the relatively limited dependency of coefficients C on D.

The second consequence is that, due to the large value of D, the variation of coefficient $C_{i'j'}{}^i$ (H,D) on D is very slow for a given H, as depicted in FIG. 9B. FIG. 9B illustrates the relatively limited dependency of coefficients C on D. The typical distance between the source 2 and the array 4 being more than seven meters, the coefficients C are varying slowly in D. The inspection radiation 1 from source 51 and source S2 are intercepting the array 4 in a very similar way (note that FIG. 9B is not to scale).

The coefficients C may thus be calculated for a reduced set of m values for D, e.g. values ($D_1$, $D_2$, ..., $D_m$), and for the other values of D between the reduced set of values, the coefficients C can be deduced by interpolation.

Therefore, alternatively or additionally, for a displacement of the radiation source 2 along the direction parallel to the depth direction (O'd), the coefficients may be such that:

$$C_{i'j'}^{i}(H, D) \approx C_{i'j'}^{i}(H, D_n) + \frac{C_{i'j'}^{i}(H, D_{n+1}) - C_{i'j'}^{i}(H, D_n)}{(D_{n+1} - D_n)} \cdot (D - D_n)$$

with n and m being positive integers and $D_n \leq D \leq D_{n+1}$.

The third consequence of the distances in the inspection system is better understood in combination with a property of periodicity as explained below.

Figure 10:
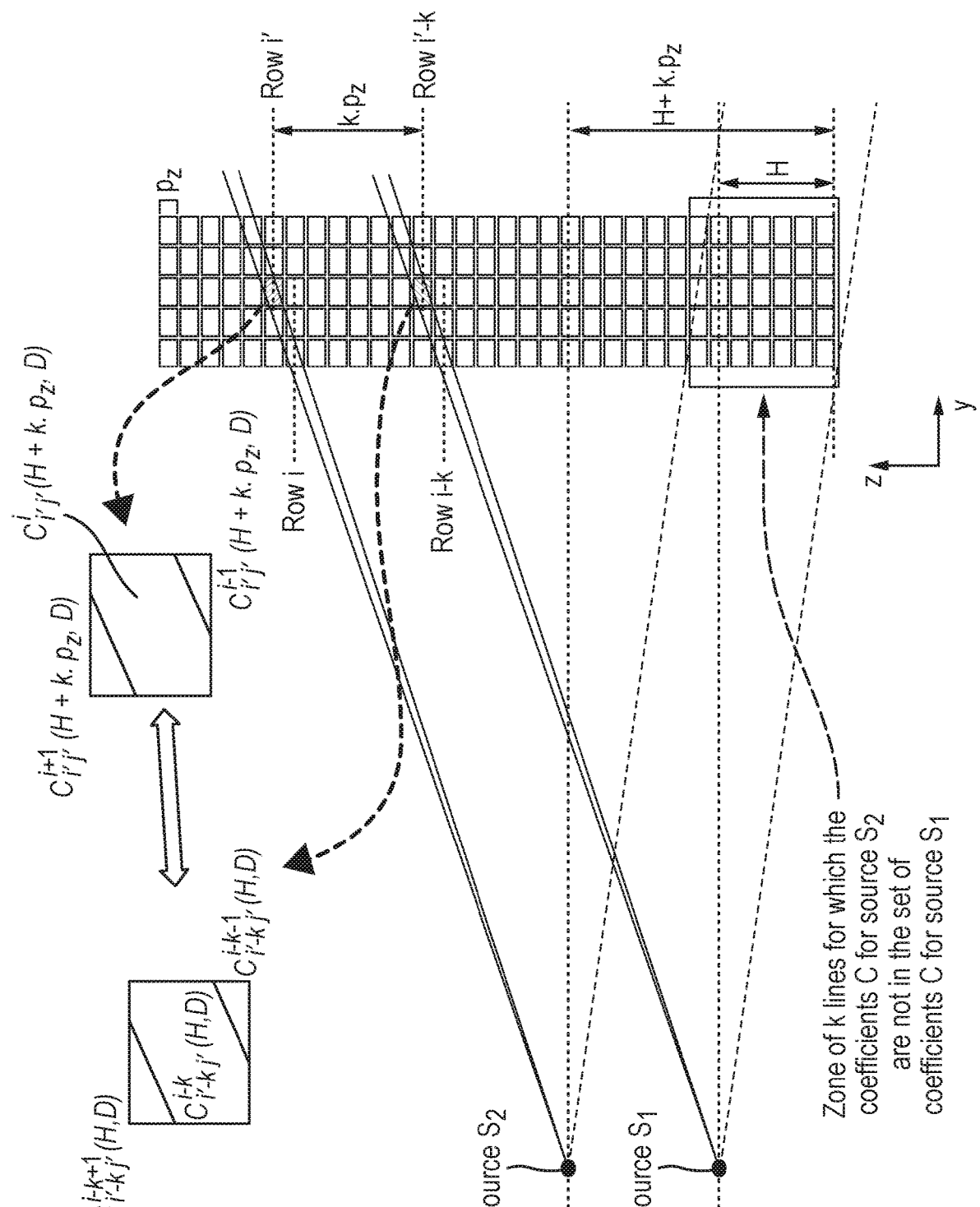
FIG. 10 schematically illustrates the periodicity $p_z$ of the coefficients C according to the parameter H, FIG. 11 schematically illustrates that coefficients of a horizontal array may be calculated in a similar way by choosing the right values for H and D.

As illustrated in FIG. 10, a periodicity of the coefficients C according to the parameter H is an important property which demonstrates the possibility of reducing the number of calculations of the coefficients C.

For example, as illustrated in FIG. 10, if the radiation source 2 is displaced in the (OZ) direction by a distance equal to the pitch $p_z$ in the (O'D) direction, the detector cell (i'j') plays, in the new position, the same role for the incident flux on line i, as the detector cell (i'−1,j') was playing for the incident flux on line i−1 before the displacement of the source 2.

The only exception to this rule is the side effect for the row at the extremity of the array opposite the displacement. For example, if the source 2 is displaced of a distance $p_z$ upwards in the direction (OZ), for i=1, i−1 is 0 and then the coefficients of the first line $C_1{}^1{}_{j'}(H+p_z, D)$ cannot be found in the set of coefficient $C_{i'j'}{}^i$ (H,D). The same occurs for the upper line when the displacement is downwards. These remarks can be extended for larger displacements, multiple of $p_z$:

Therefore, alternatively or additionally, for a displacement of the radiation source 2 by k rows of pitch $p_z$ along the direction parallel to the longitudinal direction (O'D), the coefficients may be such that:

$$C_{i'j'}^{i}(H \pm k \cdot p_z, D) = C_{i' \mp k\ j'}^{i \mp k}(H,D)$$

with k being a positive integer,
except for the coefficients corresponding to the first k lines of the array for a positive displacement of the radiation source, or except for coefficients corresponding to the last k lines of the array for a negative displacement of the radiation source.

Although H and D are continuous parameters, if the side effects on the extreme rows are ignored, the above-described periodicity shows that knowing $C_{i'j'}{}^i$ (H,D) for values of H in an interval of width $p_z$ is enough, because the other values of C may be deduced using the periodicity in the (O'D) direction.

Coming back to the third consequence of the distances in the inspection system, the distances in the inspection system are such that the variation of $C_{i'j'}{}^i$ (H,D) remains very small when H covers only such a short interval.

We thus note that knowing $C_{i'j'}{}^i$ (H,D) for the value of H in the center of a row (H=(k+½)$p_z$) or at the extremity (k·$p_z$) enables determining the C by interpolation for any values of H in the interval, and therefore for any value of H along the column—if the above described side effects are ignored.

Therefore, alternatively or additionally, for H, [(k−½)·$p_z$, (k+½)·$p_z$], with k being a positive integer, the other coefficients $C_{i'j'}{}^i$ may be interpolated based on the coefficients $C_{i'j'}{}^i$ determined at S611 for the reduced set of rows i, such that:

$$C_{i'j'}^{i}(H, D) \approx C_{i'j'}^{i}\left(\left(k - \frac{1}{2}\right) \cdot p_z, D\right) + \frac{C_{i'-1,j'}^{i-1}\left(\left(k - \frac{1}{2}\right) \cdot p_z, D\right) - C_{i'j'}^{i}\left(\left(k - \frac{1}{2}\right) \cdot p_z, D\right)}{p_z} \cdot (H - p_z).$$

The developments above explain examples where the detector cells 5 has a linear response as a function of the flux input.

Alternatively or additionally, for example in cases where the detector cells 5 do not have a linear response as a function of the flux input—but the approach explained below also applies to detector cells having a linear response—, the function F may be the conditional probability of S given I and R, such that:

$$F(I,R)=P(S|I,R)$$

In cases where the signal data and the contribution arrangement are normalized, the function F may be the conditional probability of such that:

$$F^N(I,C)=P(S^N|I,C).$$

In cases where the function F is the conditional probability of S given I and R, determining at S2 the flux $I_i$ of the inspection radiation incident on row i, for each row i such that 1≤i≤L, may include maximizing the probability P(S|I,R) or the probability $P(S^N|I,C)$ by maximum likelihood estimation and/or by log-likelihood estimation.

MODIFICATIONS AND VARIATIONS

Figure 11:
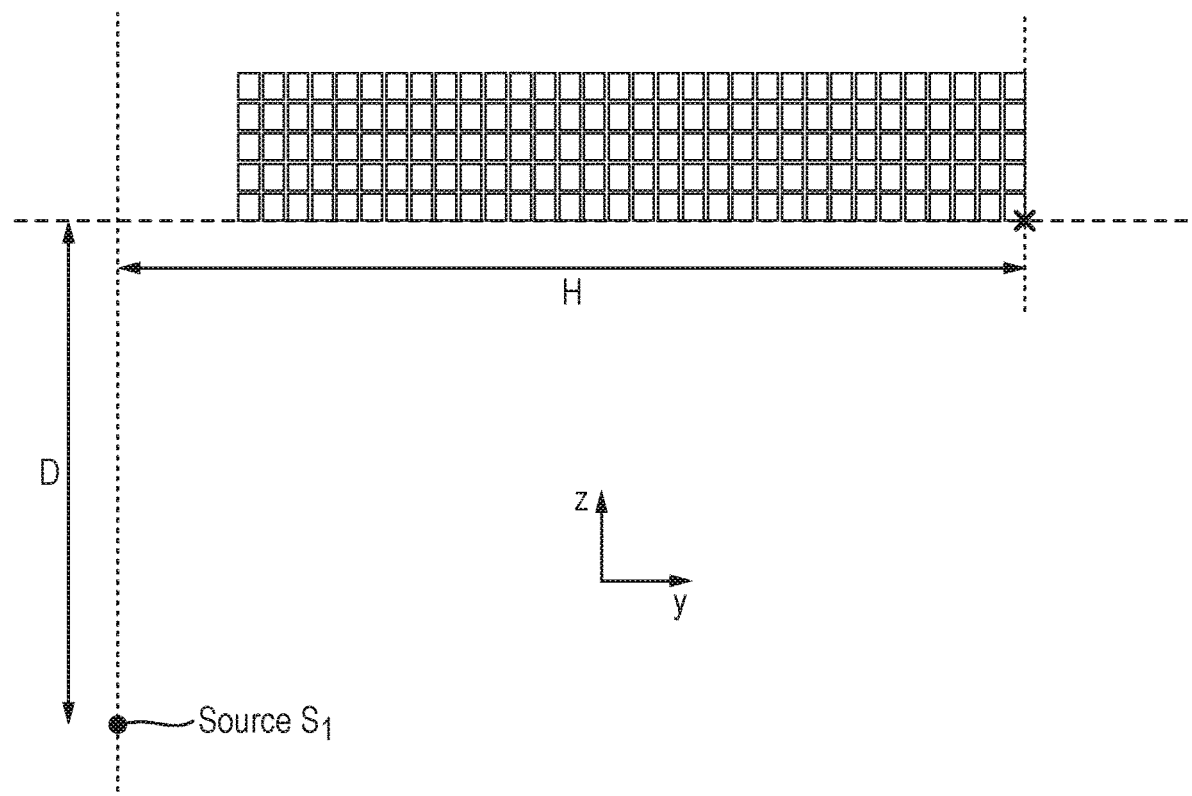

Inspection systems usually have a boom having a vertical part and a horizontal part, and each part may include at least one array according to the disclosure. The developments above explain methods and systems for a vertical array. As illustrated in FIG. 11, coefficients of a horizontal array may be calculated in a similar way by choosing the right values for H and D, e.g. by swapping the vertical and the horizontal coordinate (Y and Z) for H and D. The described calculations are the same if D is chosen as the vertical distance between the source and the entrance face of the array and H is chosen as the horizontal distance between the source and the opposite end of the detectors line.

In the developments above, a distance $p_y$ between the columns of the array in the direction parallel to the depth direction (O'd) of the array is a constant. However, for an array with a constant distance $p_y$, the first columns partially filter the inspection radiation and the flux incident on the last column is smaller. Hence, the last columns generally generate less signal.

Figure 12:
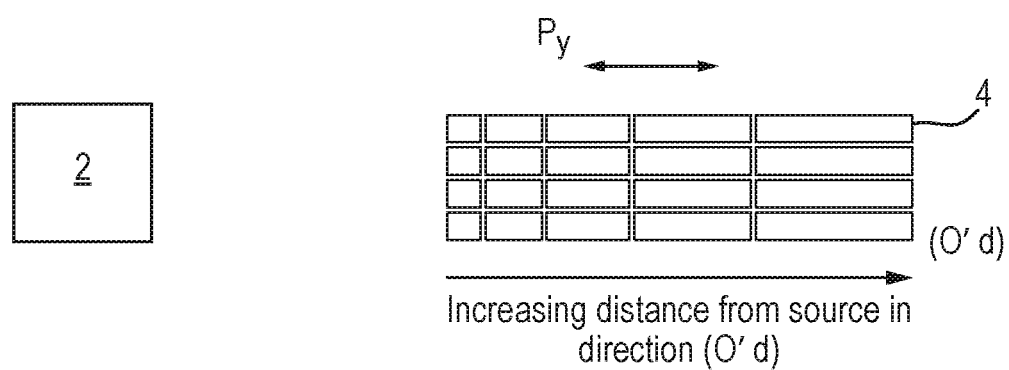
FIG. 12 schematically illustrates that a distance $p_y$ between the columns of the array in the direction parallel to the depth direction of the array may vary along the direction parallel to the depth direction of the array, FIG. 13 schematically illustrates that some columns closer to the radiation source may be made of a lower atomic number material, and some columns further from the radiation source are made of higher atomic number material.

Therefore, alternatively or additionally, as illustrated in FIG. 12, a distance $p_y$ between the columns of the array in the direction parallel to the depth direction of the array may vary along the direction parallel to the depth direction of the array, and the distance $p_y$ may increase with an increasing distance from the radiation source. The array of FIG. 12 allows the signal to be more homogeneously distributed along the columns. With a non-constant pitch configuration, the thicknesses of the cells can be chosen such as the full-scale signals (without object in the inspection radiation) are approximately equal on each column. The above developments for the calculation of the coefficients C remain valid and the equations remain the same with just slight modifications (e.g. limits of the integral).

The number of columns in the plurality λ is such that:

$$2\le\lambda.$$

The number of columns in the plurality λ may be such that:

$$2\le\lambda\le10, \text{ such as } 3\le\lambda\le8.$$

Figure 13:
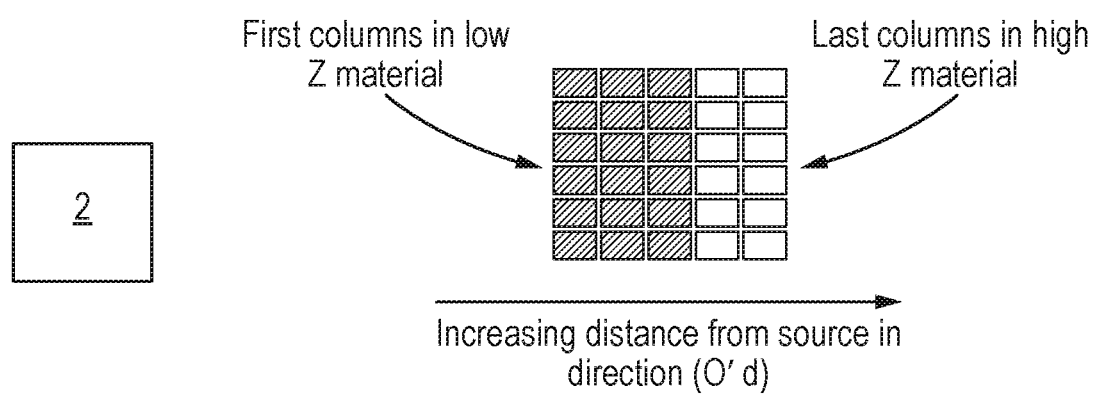

In the above development a material of the detector cells may be identical for all of the detector cells of the array. In some embodiments, a material of at least some of the detector cells may be different from the material of at least some other detector cells of the array. As illustrated in FIG. 13, some columns closer to the radiation source may be made of a lower atomic number material, and some columns further from the radiation source are made of higher atomic number material.

Figure 14A:
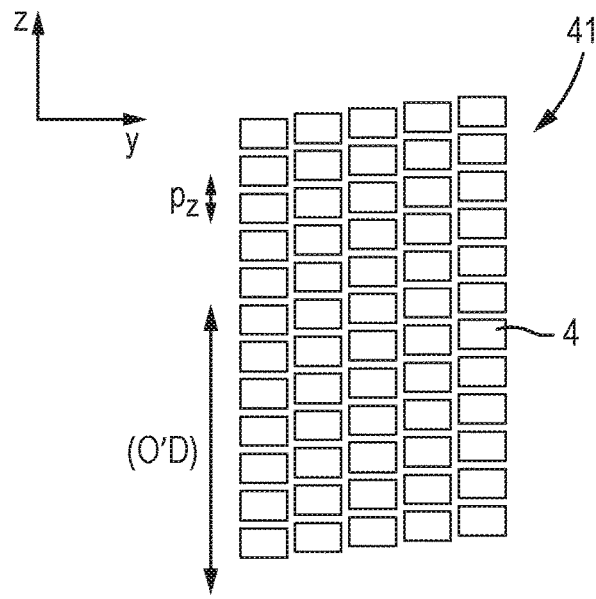
FIGS. 14A and 14B schematically illustrate that each row may be shifted, with respect to an adjacent row in the array in the direction parallel to the longitudinal direction (O'D) of the array.
Figure 14B:
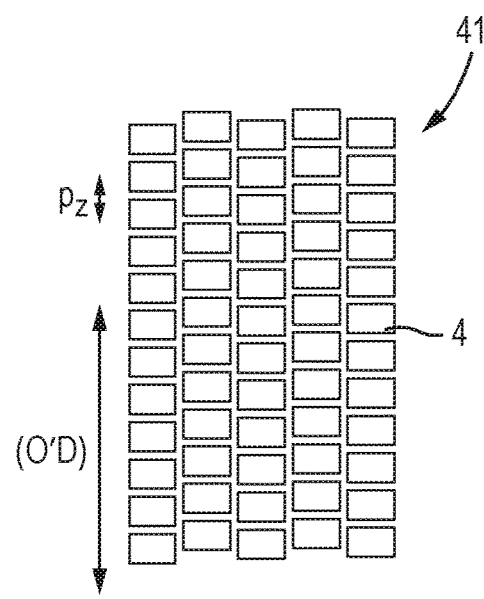

As illustrated in FIGS. 14A and 14B, each row may be shifted, with respect to an adjacent row in the array in the direction parallel to the longitudinal direction (O'D) of the array, e.g. by half a pitch $p_z$ of the rows of the array in the direction parallel to the longitudinal direction (O'D) of the array in the example of FIG. 14B, but other shifts are envisaged, as illustrated in FIG. 14A, such as a shift of $p_z/\lambda$. As illustrated in FIG. 14A, the shift may be constantly positive (or constantly negative would also be envisaged) between two consecutive columns of the array, for the whole array. As illustrated in FIG. 14B, the half pitch $p_z$ shift may alternate between a positive shift and a negative shift between two consecutive columns of the array. Embodiments according to FIGS. 14A and 14B enhance the spatial resolution in the longitudinal direction (O'D), by splitting the entrance flux $I_i$ in two subpixels and by calculating the corresponding set of coefficient C.

The present disclosure may be applied to an inspection system including a plurality of radiation sources for a single array, such as a multiview inspection system and/or an inspection system for inspection of bilevel vehicles and/or an inspection system including a source configured to move with respect to the array.

Figure 15:
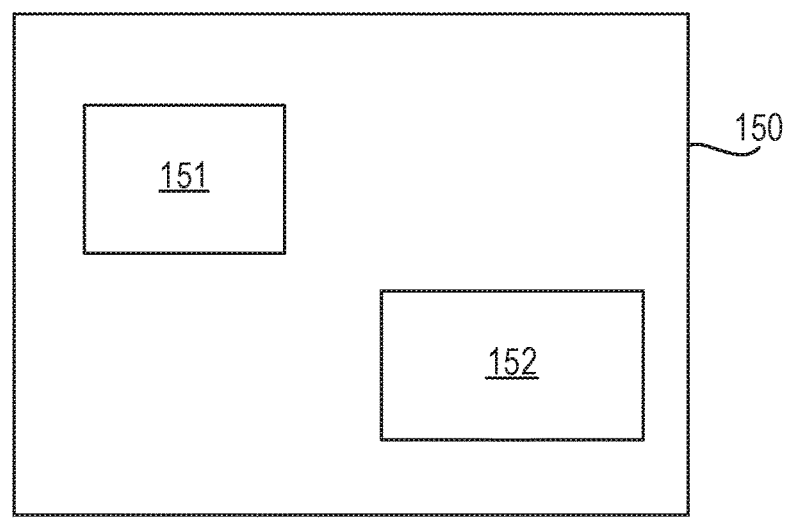
FIG. 15 schematically illustrates an apparatus including a processor and a memory.

As illustrated in FIG. 15, the present disclosure also concerns an apparatus 150 including:
- a processor 151; and
- a memory 152 storing instructions which, when executed by the processor 151, enable the apparatus 150 to perform the method of any of any aspects of the disclosure.

The inspection system (e.g. apparatus) according to the disclosure may include a plurality of arrays according to the disclosure, e.g. the plurality of arrays being adjacent to each other in the direction of scan of the cargo.

The inspection radiation may be any type of ionizing radiation, such as X-ray, gamma rays, neutrons as non-limiting examples.

The present disclosure also concerns a computer program or a computer program product including instructions which, when executed by a processor, enable the processor to perform the method of any of any aspects of the disclosure.

The invention claimed is:

1. A method for determining a flux of inspection radiation,
    wherein the inspection radiation is emitted by a radiation source and transmitted through cargo to inspect substantially in a transmission plane (YOZ),
    wherein the flux of inspection radiation is incident, after transmission through the cargo, on at least one array of detector cells extending in a plane substantially parallel to the transmission plane (YOZ), the array having a depth direction, and a longitudinal direction substantially perpendicular to the depth direction,
    the detector cells being configured in a first plurality L forming substantially rows of the array, each row of detector cells extending substantially along a direction parallel to the depth direction of the array,
    the detector cells being further configured in a second plurality 2 forming substantially at least two columns of the array, each column of detector cells extending substantially along a direction parallel to the longitudinal direction of the array, the method comprising:
obtaining signal data $S_{i'j'}$ associated with each detector cell of the array, each detector cell being located in (i',j') at an intersection of a column j' and a row i' of the array, the obtained signal data S for the array of detector cells being such that:

$$S = F(I, R)$$

with I being a flux assembly corresponding to the flux of the inspection radiation incident on the rows of the array,
R being a contribution arrangement of coefficients $R_{i'j'}^i$ for the array of detector cells, representing a contribution of a beam of the inspection radiation, incident on row i such that $1 \le i \le L$, to the signal data $S_{i'j'}$ of the detector cell located in (i',j') incident on the rows i of the array, and
F being a known function of I and R; and
determining the flux $I_i$ of the inspection radiation incident on row i, for each row i such that $1 \le i \le L$, based on the obtained signal data $S_{i'j'}$ and the coefficient $R_{i'j'}^i$ for each detector cell located in (i',j') at the intersection of the column j' and the row i' of the array.

2. The method of claim 1, further comprising normalizing the obtained signal data S, such that:

$$S_{i'j'}^N = \frac{S_{i'j'}}{S_{i'j'}^0}$$

with $S_{i'j'}^0$ being a signal obtained when no object is placed in the irradiation radiation; and
further comprising normalizing the contribution arrangement R, such that:

$$C_{i'j'}^i = \frac{R_{i'j'}^i}{\sum_{k=1}^{L} R_{i'j'}^k}$$

such that:

$$S^N = F^N(I, C)$$

with $F^N$ a known function of I and C.

3. The method of claim 2, wherein the function F is the conditional probability of S given I and R, such that:

$$F(I, R) = P(S | I, R).$$

4. The method of claim 3, wherein the function F is the conditional probability of such that:

$$F^N(I, C) = P(S^N | I, C).$$

5. The method of claim 3, wherein determining the flux $I_i$ of the inspection radiation incident on row i, for each row i such that $1 \le i \le L$, comprises maximizing the probability $P(S | I, R)$ or the probability $P(S^N | I, C)$ by maximum likelihood estimation and/or by log-likelihood estimation.

6. The method of claim 2, wherein the known function F is a linear function such that:

$$S_{i'j'} = \sum_{i=1}^{L} R_{i'j'}^i I_i$$

with $I_i$ the flux of the inspection radiation incident on row i, and $R_{i'j'}^i$ representing a contribution of a beam of the inspection radiation, incident on row i, to the signal data $S_{i'j'}$ of the detector cell located in (i',j').

7. The method of claim 6, wherein normalizing the obtained signal data $S_{i'j'}^N$ for each detector cell being located in (i',j') is such that:

$$S_{i'j'}^N = \frac{S_{i'j'}}{S_{i'j'}^0} = \frac{S_{i'j'}}{\sum_{k=1}^{L} R_{i'j'}^k I_k^0} = \frac{\sum_{i=1}^{L} R_{i'j'}^i I_i}{\sum_{k=1}^{L} R_{i'j'}^k I_k^0} = \sum_i \left( \frac{R_{i'j'}^i I_i}{\sum_{k=1}^{L} R_{i'j'}^k} \right) = \sum_i C_{i'j'}^i I_i$$

with $S_{i'j'}^N \in [0, 1]$,
with $S_{i'j'}^0 = \sum_{i=1}^{L} R_{i'j'}^i I_i^0$ with $I_i^0$ being the flux of full-scale inspection radiation obtained when no object is placed in the irradiation radiation, incident on row i,
with $I_i^0$ being chosen equal to 1 for each row i such that $1 \le i \le L$, which implies the $I_i$ to have values in [0, 1],
with each coefficient $C_{i'j'}^i$ being such that $$C_{i'j'}^i = \frac{R_{i'j'}^i}{\sum_{k}^{L} R_{i'j'}^k},$$

and
with $\sum_i C_{i'j'}^i = 1$; and
determining the flux $I_i$ of the inspection radiation incident on row i, for each row i such as $1 \le i \le L$, based on the normalized uniform signal data $S_{i'j'}^N$ and the coefficient $C_{i'j'}^i$ for each detector cell located in (i',j') at the intersection of the column j' and the row i' of the array.

8. The method of claim 7, wherein determining the flux $I_i$ of the inspection radiation incident on row i, for each row i such that $1 \le i \le L$, comprises using a least squares regression to find a set of fluxes $I_i$ which minimizes a criterion $L_s$, such that:

$$L_s = \sum_{i'j'} (S_{i'j'}^N - \sum_i C_{i'j'}^i I_i)^2.$$

9. The method of claim 8, wherein the set of fluxes $I_i$ which minimizes the criterion $L_s$ is determined using a gradient minimalization technique, or
wherein the set of fluxes $I_i$ which minimizes the criterion $L_s$ is determined by determining a solution of a matrix equation $M_{ki}$ such that:

$$\forall k, \sum_{i',j'} C_{i'j'}^k S_{i'j'}^N = \sum_i \underbrace{(\sum_{i',j'} C_{i'j'}^k \cdot C_{i'j'}^i)}_{M_{ki}} \cdot I_i.$$

10. The method of claim 9, wherein each coefficient $C_{i'j'}^i$ depends on at least one of:
a distance D, between the radiation source and the array of detectors cells; and/or
a height H of the source associated with a distance between a first line parallel to a lower part of the array and a second line parallel to the first line and passing through the radiation source; and/or
a pitch $p_z$ of the array along a direction parallel to the longitudinal direction, and a distance $p_y$ between the columns of the array along a direction parallel to the depth direction of the cells, and
wherein determining the solution of the matrix equation $M_{ki}$ comprises conditioning the matrix $M_{ki}$ such that the matrix $M_{ki}$ does not have significant coefficients far from the diagonal of the matrix $M_{ki}$ and inverting the matrix $M_{ki}$, optionally wherein conditioning the matrix $M_{ki}$ comprises estimating each coefficient $C_{ij'}{}^i$ which contributes to the terms of the matrix $M_{ki}$ substantially around the diagonal of the matrix $M_{ki}$ and valuating other coefficients of the matrix $M_{ki}$ to a null value, optionally wherein estimating each coefficient City' substantially around the diagonal of the matrix $M_{ki}$ comprises, for D>>$p_z$ and D>>T, and for a given pair (H,D) and a given column j':

determining coefficients $C_{ij'}{}^i$ for a reduced set of rows i; and interpolating other coefficients $C_{ij'}{}^i$ based on the determined coefficients $C_{ij'}{}^i$ for the reduced set of rows i.

11. The method of claim 10, wherein the other coefficients $C_{ij'}{}^i$ are interpolated based on the determined coefficients $C_{ij'}{}^i$ for the reduced $i_p$ set of rows i, such that:

$$C_{i'j'}^i \approx C_{i'-(i-i_p)j'}^{i_p} + \frac{\left(C_{i'-(i-i_{p+1})j'}^{i_{p+1}} - C_{i'-(i-i_p)j'}^{i_p}\right)}{(i_{p+1} - i_p)} \cdot (i - i_p)$$

with $i_p \leq i \leq i_p + 1$, and with p being a positive integer.

12. The method of claim 10, wherein, for H·[(k−½)·$p_z$, (k+½)·$p_z$], with k being a positive integer, the other coefficients $C_{ij'}{}^i$ are interpolated based on the determined coefficients $C_{ij'}{}^i$ for the reduced set of rows i, such that:

$$C_{i'j'}^i(H, D) \approx C_{i'j'}^i\left(\left(k - \frac{1}{2}\right) \cdot p_z, D\right) + \frac{C_{i'-1,j'}^{i-1}\left(\left(k - \frac{1}{2}\right) \cdot p_z, D\right) - C_{i'j'}^i\left(\left(k - \frac{1}{2}\right) \cdot p_z, D\right)}{p_z} \cdot (H - p_z)$$

13. The method of claim 10, wherein, for a displacement of the radiation source by k rows of pitch $p_z$ along the direction parallel to the longitudinal direction, the coefficients are such that:

$$C_{ij'}^i(H \pm k \cdot p_z, D) = C_{i \mp k, j'}^{i \mp k}(H, D)$$

with k being a positive integer, except for the coefficients corresponding to the first k lines of the array for a positive displacement of the radiation source, or except for coefficients corresponding to the last k lines of the array for a negative displacement of the radiation source.

14. The method of claim 10, wherein, for a displacement of the radiation source along the direction parallel to the depth direction, the coefficients are such that:

$$C_{i'j'}^i(H, D) \approx C_{i'j'}^i(H, D_n) + \frac{C_{i'j'}^i(H, D_{n+1}) - C_{i'j'}^i(H, D_n)}{(D_{n+1} - D_n)} \cdot (D - D_n)$$

with n being a positive integer.

15. The method of claim 10, wherein determining the coefficients $C_{ij'}{}^i$ for the reduced set of rows i comprises determining the contribution $R_{ij'}{}^i$ such that:

$$R_{i'j'}^i = \int_{y=j' \cdot p_y}^{y=(j'+1) \cdot p_y} \int_{z=(i' \cdot p_z - H)}^{z=(i'+1) \cdot p_z - H} \int_0^{E_M} I(E, \theta) \cdot \mu_{en}(E) \cdot E \cdot \frac{e^{-\frac{\mu(E) \cdot y}{\cos(\theta)}}}{(D+y)^2} \cdot \cos(\theta) \cdot u(\cos(\theta_i) - \cos(\theta)) \cdot u(\cos(\theta) - \cos(\theta_{i+1})) \, dE \, dz \, dy$$

with:

E=a variable associated with the energy of the inspection radiation, $E_M$=a maximum of the energy of the inspection radiation, θ=an angular incidence of the inspection radiation on the array in the transmission plane (YOZ), with a y axis being parallel to the depth direction and a z axis being parallel to the longitudinal direction, such that:

$$\tan(\theta) = \left(\frac{z - H}{D + y}\right),$$

$$\cos(\theta) = \sqrt{\frac{1}{1 + \left(\frac{z-H}{D+y}\right)^2}},$$

$\theta_i$=an angle of incidence of the inspection radiation on row i, such that:

$$\tan(\theta_i) = \left(\frac{i \cdot p_z - H}{D}\right),$$

I (E,θ)=spectral and angular distributions of the inspection radiation, $\mu_{en}$ (E)·E=a mean deposit energy in the detector cell for a photon of energy E, and u=a step function.

16. The method of claim 10, wherein determining the coefficients $C_{ij'}{}^i$ for the reduced set of rows i comprises determining the contribution $R_{ij'}{}^i$ such that:

$$R_{i'j'}^i = \int_{y=j' \cdot p_y}^{y=(j'+1) \cdot p_y} \int_{z=(i' \cdot p_z - H)}^{z=(i'+1) \cdot p_z - H} \frac{1}{(D+y)^2} \cdot \cos(\theta(x, y)) \cdot u(\cos(\theta_i) - \cos(\theta(x, y))) \cdot u(\cos(\theta(x, y) - \cos(\theta_{i+1}))) dz \, dy$$

with:

θ=an angular incidence of the inspection radiation on the array in the transmission plane (YOZ), with a y axis being parallel to the depth direction and a z axis being parallel to the longitudinal direction, such that:

$$\tan(\theta) = \left(\frac{z - H}{D + y}\right),$$

$$\cos(\theta) = \sqrt{\frac{1}{1 + \left(\frac{z-H}{D+y}\right)^2}},$$

$\theta_i$=an angle of incidence of the inspection radiation on row i, such that:

$$\tan(\theta_i) = \left(\frac{i \cdot p_z - H}{D}\right),$$

and an x axis being perpendicular to both the depth direction and the longitudinal direction.

17. The method of claim 10, wherein determining the coefficients $C_{ij'}^i$ for the reduced set of rows i comprises using a Monte-Carlo method configured to calculate:

angular and spectral distributions of the inspection radiation, and/or a simulation configured to estimate an energy deposit in the detector cell (i',j').

18. The method of claim 10, wherein determining the coefficients $C_{ij'}^i$ for the reduced set of rows i comprises:

determining initial coefficients $C_{ij'}^i$ and generating an image $I^c$ of the cargo, based on the determined initial coefficients $C_{ij'}^i$;

generating an image $I^a$ of the cargo, based on initial adjusted coefficients $C_{ij'}^i$ corresponding to adjusted determined initial coefficients $C_{ij'}^i$; and determining final adjusted coefficients $C_{ij'}^i$ minimizing a criterion such that:

$$\sum_{images} \sum_i \left((I_i^a - I_i^c)^2 + \frac{m}{(\nabla I^a)_i^2}\right)$$

with $\nabla$ is a gradient operator, and m a positive parameter, optionally wherein the signal data $S_{ij'}$ is associated with cargo with sharp edges.

19. The method of claim 1, further comprising:

generating an inspection image of the cargo, based on the determined flux $I_i$ of the inspection radiation incident on row i, for each row i such as $1 \leq i \leq L$.

20. The method of claim 1, applied to an inspection system comprising a plurality of radiation sources for a single array, such as a multiview inspection system and/or an inspection system for inspection of bilevel vehicles and/or an inspection system comprising a source configured to move with respect to the array.

* * * * *